US012652655B2

(12) United States Patent (10) Patent No.: US 12,652,655 B2

Liu et al. (45) Date of Patent: Jun. 9, 2026

---

(54) METHOD AND APPARATUS FOR NODE USED FOR WIRELESS COMMUNICATION

(71) Applicant: Quectel Wireless Solutions Co., Ltd., Shanghai (CN)

(72) Inventors: Zheng Liu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 685 days.

(21) Appl. No.: 18/064,692

(22) Filed: Dec. 12, 2022

(65) Prior Publication Data

US 2023/0110721 A1 Apr. 13, 2023

Related U.S. Application Data

(63) Continuation of application No. PCT/CN2021/089970, filed on Apr. 26, 2021.

(30) Foreign Application Priority Data

Aug. 27, 2020 (CN) .......................... 202010879105.4

(51) Int. Cl.
*H04W 72/044* (2023.01)
*H04L 5/00* (2006.01)

(52) U.S. Cl.
CPC ......... *H04W 72/044* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 2009/0238148 A1 | 9/2009 | Englund et al. | |
| 2019/0363843 A1 | 11/2019 | Gordaychik | |
| 2020/0287665 A1* | 9/2020 | Lee ........................ | H04L 1/1874 |

(Continued)

FOREIGN PATENT DOCUMENTS

| | | |
|---|---|---|
| CN | 110838898 A | 2/2020 |
| CN | 110912656 A | 3/2020 |

(Continued)

OTHER PUBLICATIONS

First Office Action issued in counterpart Chinese Patent Application No. 202010879105.4, dated Sep. 24, 2021.

(Continued)

*Primary Examiner* — Jamaal Henson

(74) *Attorney, Agent, or Firm* — Westbridge IP LLC

(57) ABSTRACT

Disclosed are a method and an apparatus for a node used for wireless communication. The first node first receives a first wireless signal in a first time-frequency resource pool, where the first wireless signal carries a first block of bits; next sends first signaling in a second time-frequency resource pool, where the first signaling is used to indicate whether the first block of bits is correctly decoded; then monitors a second wireless signal in a third time-frequency resource pool, where the second wireless signal carries the first block of bits; and when the first signaling indicates that the first block of bits is not correctly decoded, the first node sends second signaling in a fourth time-frequency resource pool by using a first power value.

20 Claims, 5 Drawing Sheets

(56) References Cited

U.S. PATENT DOCUMENTS

| | | | | |
|---|---|---|---|---|
| 2021/0029673 A1* | 1/2021 | Zhang | .................. | H04L 1/1819 |
| 2021/0266869 A1* | 8/2021 | Jeong | ................... | H04L 1/1819 |
| 2021/0314109 A1* | 10/2021 | Zhao | ................ | H04W 72/0446 |
| 2023/0058037 A1* | 2/2023 | Yeo | ........................ | H04L 1/1819 |
| 2023/0171035 A1* | 6/2023 | Li | .......................... | H04L 1/189 |
| | | | | 370/329 |

FOREIGN PATENT DOCUMENTS

| | | | |
|---|---|---|---|
| CN | 111082915 A | 4/2020 |
| CN | 111147216 A | 5/2020 |
| CN | 111246427 A | 6/2020 |
| CN | 111246558 A | 6/2020 |
| CN | 111278108 A | 6/2020 |
| CN | 111294180 A | 6/2020 |
| CN | 111315028 A | 6/2020 |
| CN | 111356099 A | 6/2020 |
| CN | 112436873 A | 3/2021 |
| WO | 2020032203 A1 | 2/2020 |

OTHER PUBLICATIONS

International Search Report issued in corresponding PCT Application No. PCT/CN2021/089970, dated Jul. 26, 2021.
Notification to Grant Patent Right for Invention issued in counterpart Chinese Patent Application No. 202010879105.4, dated Jan. 10, 2022.
Written Opinion issued in corresponding PCT Application No. PCT/CN2021/089970, dated Jul. 26, 2021.
European Search Report issued in counterpart European Patent Application No. EP 21859657.5, dated Oct. 16, 2023.

* cited by examiner

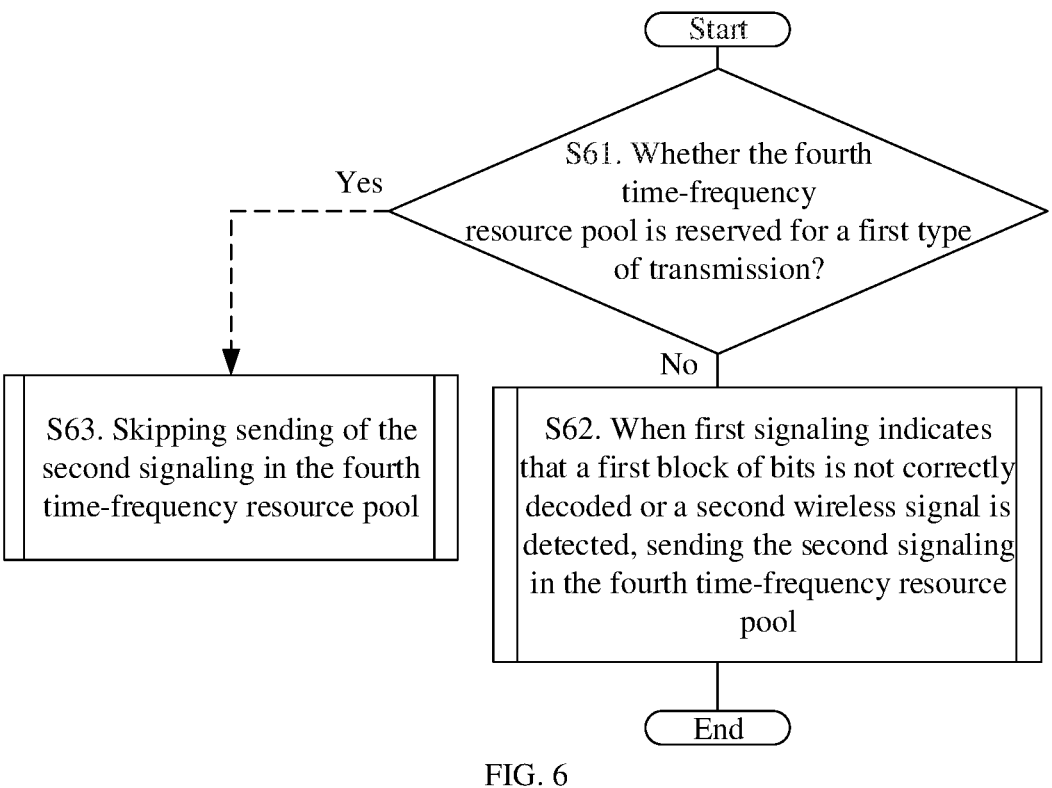
FIG. 6
Second power value = First power value + δ
FIG. 7
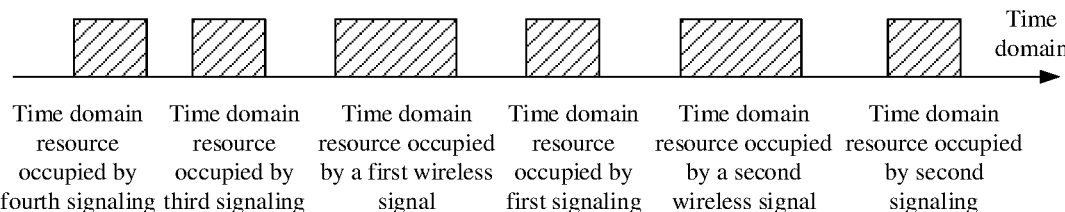
FIG. 8

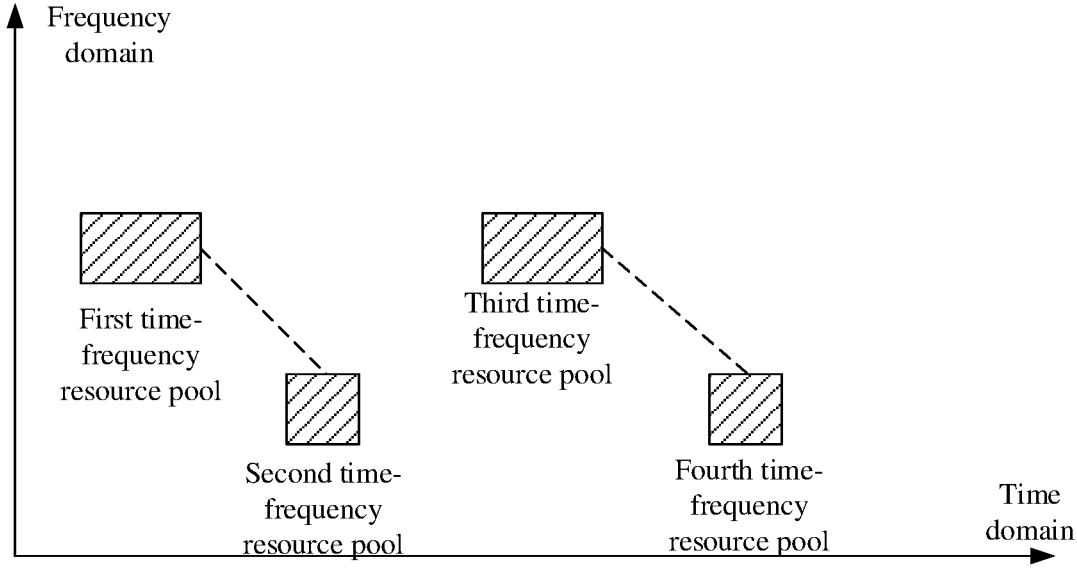
FIG. 9
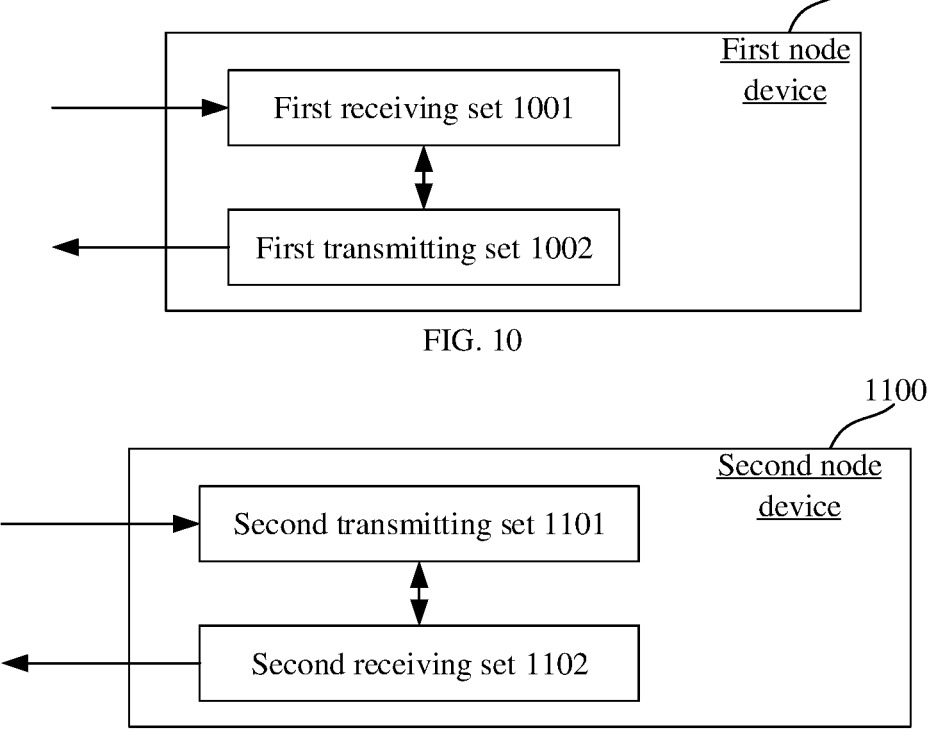
FIG. 10
FIG. 11

METHOD AND APPARATUS FOR NODE USED FOR WIRELESS COMMUNICATION

CROSS-REFERENCE TO RELATED APPLICATIONS

This application is a continuation of International Application No. PCT/CN2021/089970, filed on Apr. 26, 2021, which claims priority to Chinese Patent Application No. 202010879105.4, filed on Aug. 27, 2020. The disclosures of the aforementioned applications are hereby incorporated by reference in their entireties.

TECHNICAL FIELD

The present application relates to a transmission method and apparatus in a wireless communications system, and in particular, to a transmission solution and apparatus for feedback information in wireless communication.

BACKGROUND

Application scenarios of a future wireless communications system are increasingly diversified, and different application scenarios impose different performance requirements on the system. To meet the different performance requirements of various application scenarios, at the 3rd Generation Partnership Project (3GPP) Radio Access Network (RAN) #72 plenary meeting, the New Radio (NR) (or Fifth Generation (5G)) technology was decided to be studied; and at the 3GPP RAN #75 plenary meeting, the Work Item (WI) of NR was approved and standardization of NR was started.

For rapidly developing Vehicle-to-Everything (V2X) services, 3GPP has also started standard formulation and research work under the NR framework. At present, 3GPP has completed formulation of requirements for 5G V2X services, which has been written into the standard TS22.886. 3GPP defines four Use Case Groups for 5G V2X services, including: Vehicles Platnooning, Extended Sensors, Advanced Driving, and Remote Driving. At the 3GPP RAN #80 plenary meeting, NR-based V2X technology research has been initiated.

SUMMARY

Compared with the existing Long term Evolution (LTE) V2X system, an NR V2X system has a prominent feature that may support multicast and unicast as well as a Hybrid Automatic Repeat Request (HARQ) function. A Physical Sidelink Feedback Channel (PSFCH) is introduced for HARQ-Acknowledge (ACK) transmission on a sidelink. In the results of 3GPP RANI #97 meeting, it has agreed on that the V2X services based on an NR system and HARQ feedback of a sidelink associated with a data channel Physical Sidelink Shared Channel (PSSCH) are transmitted through a periodic PSFCH.

The present application discloses a solution to a problem of enhancing transmission performance of a sidelink HARQ feedback report on a PSFCH in the NR V2X system. It should be noted that, in the description of the present application, an NR V2X scenario is only used as a typical application scenario or an example. The present application is also applicable to other scenarios other than NR V2X that face a similar problem, and a technical effect similar to that in the NR V2X scenario may also be obtained. In addition, using a unified solution for different scenarios (including but not limited to the NR V2X scenario) also helps to reduce hardware complexity and costs. In the case of no conflict, the embodiments in any node of the present application and features in the embodiments may be applied in any other node. In the case of no conflict, the embodiments of the present application and features in the embodiments may be arbitrarily combined with each other. In particular, for explanation of terminology, nouns, functions, and variables in the present application (unless otherwise specified), reference may be made to the definitions in 3GPP TS36 series, TS38 series, and TS37 series.

The present application discloses a method for a first node used for wireless communication, including:

receiving a first wireless signal in a first time-frequency resource pool, where the first wireless signal carries a first block of bits;

sending first signaling in a second time-frequency resource pool, where the first signaling is used to indicate whether the first block of bits is correctly decoded;

monitoring a second wireless signal in a third time-frequency resource pool, where the second wireless signal carries the first block of bits;

when the first signaling indicates that the first block of bits is not correctly decoded, sending second signaling in a fourth time-frequency resource pool by using a first power value; when the first signaling indicates that the first block of bits is correctly decoded and the second wireless signal is detected, sending the second signaling in the fourth time-frequency resource pool by using a second power value; and when the first signaling indicates that the first block of bits is correctly decoded and the second wireless signal is not detected, maintaining zero transmit power in the fourth time-frequency resource pool. The second signaling is used to indicate whether the first block of bits is correctly decoded.

The second power value is greater than the first power value.

In an embodiment, a problem to be resolved in the present application includes: a problem of how to enhance transmission performance of feedback signaling when channel quality of a PSFCH is poor.

In an embodiment, a feature of the method includes that: a transmit power of the second signaling is related to that the first signaling indicates whether the first block of bits is correctly decoded.

In an embodiment, a feature of the method includes that: the transmit power of the second signaling is related to whether the second wireless signal is detected.

In an embodiment, the benefits of the method include: when the first signaling indicates that the first block of bits is correctly decoded and the second wireless signal is detected, the transmit power of the second signaling is increased, and transmission performance is enhanced, thereby a probability that the second signaling is correctly received is increased.

According to an aspect of the present application, the method includes:

receiving third signaling, wherein the third signaling includes scheduling information of the first block of bits.

According to an aspect of the present application, the method includes:

receiving fourth signaling, and the fourth signaling is used to determine a difference between the second power value and the first power value.

According to an aspect of the present application, the second wireless signal is detected, and only when the fourth time-frequency resource pool is not reserved for a first type of transmission, the second signaling is sent in the fourth time-frequency resource pool; and the second time-frequency resource pool is not reserved for the first type of transmission.

The present application discloses a method for a second node used for wireless communication, including:

sending a first wireless signal in a first time-frequency resource pool, where the first wireless signal carries a first block of bits;

monitoring first signaling in a second time-frequency resource pool, where the first signaling is used to indicate whether the first block of bits is correctly decoded;

when the first signaling is detected and the first signaling indicates that the first block of bits is correctly decoded, maintaining zero transmit power in a third time-frequency resource pool; when the first signaling is detected and the first signaling indicates that the first block of bits is not correctly decoded, sending a second wireless signal in the third time-frequency resource pool, and monitoring second signaling in a fourth time-frequency resource pool, where a transmit power of the second signaling is a first power value; and when the first signaling is not detected, sending the second wireless signal in the third time-frequency resource pool, and monitoring the second signaling in the fourth time-frequency resource pool, where the transmit power of the second signaling is the first power value or a second power value. The second wireless signal carries the first block of bits; and the second signaling is used to indicate whether the first block of bits is correctly decoded.

The second power value is greater than the first power value.

According to an aspect of the present application, the method includes:

sending third signaling.

The third signaling includes scheduling information of the first block of bits.

According to an aspect of the present application, the method includes:

sending fourth signaling, and the fourth signaling is used to determine a difference between the second power value and the first power value.

According to an aspect of the present application, the second wireless signal is detected, and only when the fourth time-frequency resource pool is not reserved for a first type of transmission, the second signaling is sent in the fourth time-frequency resource pool; and the second time-frequency resource pool is not reserved for the first type of transmission.

The present application discloses a first node device used for wireless communication, including:

a first receiving set, configured to receive a first wireless signal in a first time-frequency resource pool, where the first wireless signal carries a first block of bits; and a first transmitting set, configured to send first signaling in a second time-frequency resource pool, where the first signaling is used to indicate whether the first block of bits is correctly decoded.

The first receiving set is configured to monitor a second wireless signal in a third time-frequency resource pool, and the second wireless signal carries the first block of bits.

When the first signaling indicates that the first block of bits is not correctly decoded, the first transmitting set sends second signaling in a fourth time-frequency resource pool by using a first power value. When the first signaling indicates that the first block of bits is correctly decoded and the second wireless signal is detected, the first transmitting set sends the second signaling in the fourth time-frequency resource pool by using a second power value. When the first signaling indicates that the first block of bits is correctly decoded and the second wireless signal is not detected, the first transmitting set maintains zero transmit power in the fourth time-frequency resource pool. The second signaling is used to indicate whether the first block of bits is correctly decoded.

The second power value is greater than the first power value.

The present application discloses a first node device used for wireless communication, including:

a second transmitting set, configured to send a first wireless signal in a first time-frequency resource pool, where the first wireless signal carries a first block of bits; and a second receiving set, configured to monitor first signaling in a second time-frequency resource pool, where the first signaling is used to indicate whether the first block of bits is correctly decoded.

When the first signaling is detected and the first signaling indicates that the first block of bits is correctly decoded, the second transmitting set maintains zero transmit power in a third time-frequency resource pool. When the first signaling is detected and the first signaling indicates that the first block of bits is not correctly decoded, the second transmitting set sends a second wireless signal in the third time-frequency resource pool, the second receiving set monitors second signaling in a fourth time-frequency resource pool, and a transmit power of the second signaling is a first power value. When the first signaling is not detected, the second transmitting set sends the second wireless signal in the third time-frequency resource pool, the second receiving set monitors the second signaling in the fourth time-frequency resource pool, and the transmit power of the second signaling is a second power value or the first power value. The second wireless signal carries the first block of bits; and the second signaling is used to indicate whether the first block of bits is correctly decoded.

The second power value is greater than the first power value.

In an embodiment, compared with conventional solutions, the present application has the following advantages.

Feedback performance is enhanced by adjusting a transmit power of feedback signaling on a PSFCH, a probability that the feedback signaling is correctly received is improved, and resource waste and additional interference due to retransmission caused when the feedback signaling is misjudged are reduced.

BRIEF DESCRIPTION OF THE DRAWINGS

Other features, objectives, and advantages of the present application will become more apparent upon reading the detailed description of the non-restrictive embodiments with reference to the following accompanying drawings.

FIG. 6 is a schematic diagram of a process for determining whether second signaling is transmitted in a fourth time-frequency resource pool according to an embodiment of the present application.

FIG. 7 is a schematic diagram illustrating a relationship between a first power value and a second power value according to an embodiment of the present application.

FIG. 8 is a schematic diagram of a time-domain relationship between a first wireless signal, a second wireless signal, first signaling, second signaling, third signaling, and fourth signaling according to an embodiment of the present application.

FIG. 9 is a schematic diagram of a relationship between a first time-frequency resource pool, a second time-frequency resource pool, a third time-frequency resource pool, and a fourth time-frequency resource pool according to an embodiment of the present application.

FIG. 10 is a structural block diagram of a processing apparatus for a device in a first node according to an embodiment of the present application.

FIG. 11 is a structural block diagram of a processing apparatus for a device in a second node according to an embodiment of the present application.

DETAILED DESCRIPTION OF THE EMBODIMENTS

The technical solutions of the present application are further described in detail with reference to the accompanying drawings. It should be noted that, the embodiments of the present application and features in the embodiments may be arbitrarily combined with each other if no conflict is incurred.

Embodiment 1

Figures 1, 2:
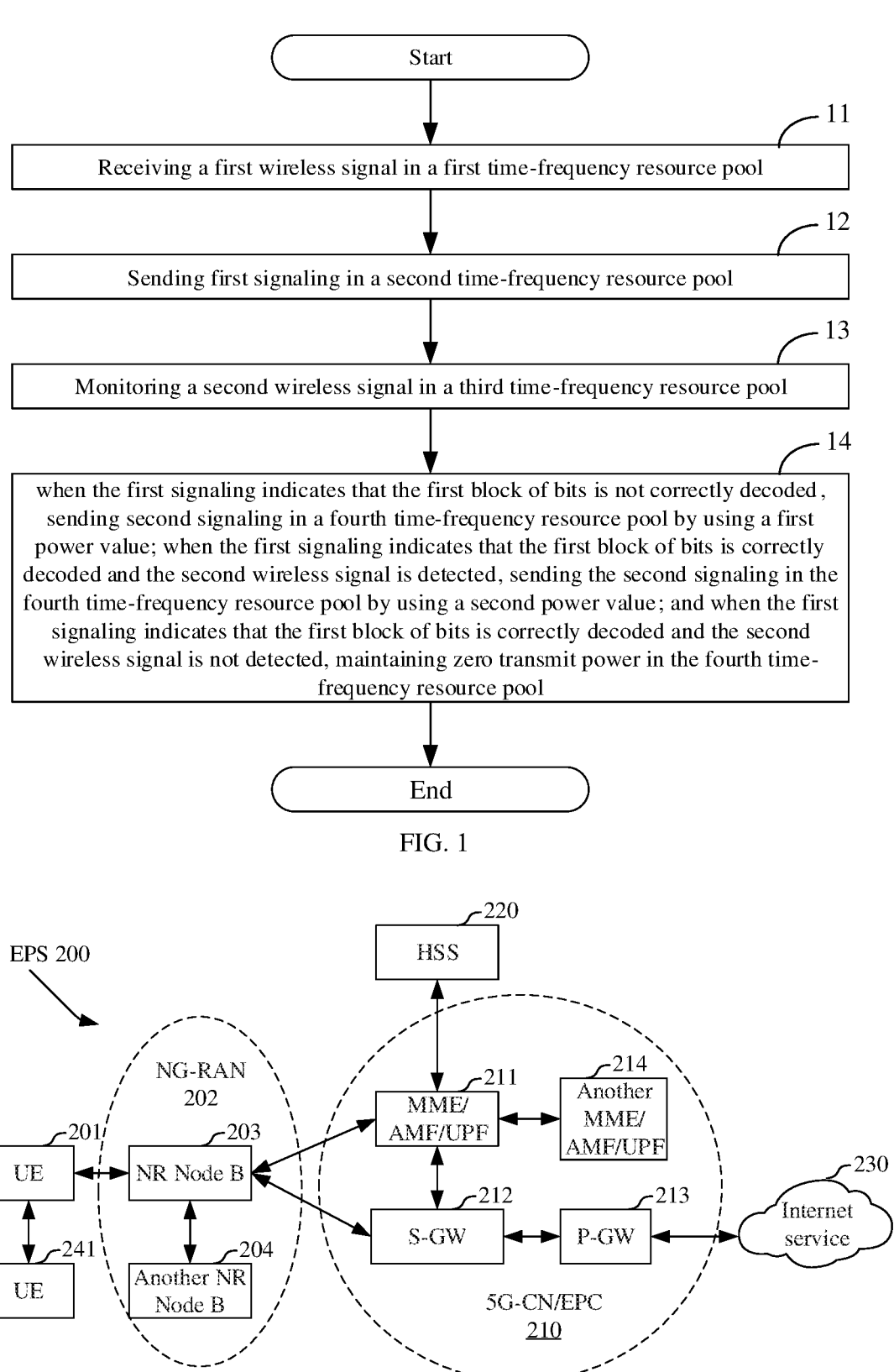
FIG. 1 is a flowchart of processing at a first node according to an embodiment of the present application.
FIG. 2 is a schematic diagram of a network architecture according to an embodiment of the present application.

Embodiment 1 illustrates a flowchart of processing at a first node according to an embodiment of the present application, as shown in FIG. 1.

In Embodiment 1, the first node in the present application receives a first wireless signal in a first time-frequency resource pool in Step 11, where the first wireless signal carries a first block of bits; sends first signaling in a second time-frequency resource pool in Step 12, where the first signaling is used to indicate whether the first block of bits is correctly decoded; monitors a second wireless signal in a third time-frequency resource pool in Step 13, where the second wireless signal carries the first block of bits; in Step 14, when the first signaling indicates that the first block of bits is not correctly decoded, sends second signaling in a fourth time-frequency resource pool by using a first power value; when the first signaling indicates that the first block of bits is correctly decoded and the second wireless signal is detected, sends the second signaling in the fourth time-frequency resource pool by using a second power value; and when the first signaling indicates that the first block of bits is correctly decoded and the second wireless signal is not detected, maintains zero transmit power in the fourth time-frequency resource pool. The second signaling is used to indicate whether the first block of bits is correctly decoded, and the second power value is greater than the first power value.

In an embodiment, when the first signaling indicates that the first block of bits is correctly decoded and the second wireless signal is detected, the second signaling indicates that the first block of bits is correctly decoded.

In an embodiment, when the first signaling indicates that the first block of bits is not correctly decoded and the second wireless signal is detected, a first receiving set performs channel decoding on the first wireless signal and the second wireless signal, determines whether the first block of bits is correctly decoded based on Cyclic Redundancy Check (CRC), and then performs indication through the second signaling.

In an embodiment, the first wireless signal and the second wireless signal are separately transmitted on a Physical Sidelink Shared Channel (PSSCH).

In an embodiment, the first wireless signal and the second wireless signal are separately transmitted on a Physical Downlink Shared Channel (PDSCH).

In an embodiment, the first wireless signal and the second wireless signal are transmitted on a same PSSCH.

In an embodiment, the first wireless signal is transmitted through a PC5 interface.

In an embodiment, the second wireless signal is transmitted through a PC5 interface.

In an embodiment, the first signaling and the second signaling are separately transmitted on a Physical Sidelink Feedback Channel (PSFCH).

In an embodiment, the first signaling and the second signaling are transmitted on a same PSFCH.

In an embodiment, the first signaling is transmitted on a Physical Uplink Control Channel (PUCCH).

In an embodiment, the second signaling is transmitted on the PUCCH.

In an embodiment, the first signaling includes HARQ-ACK.

In an embodiment, the second signaling includes HARQ-ACK.

In an embodiment, the first signaling is transmitted through a PC5 interface.

In an embodiment, the second signaling is transmitted through a PC5 interface.

In an embodiment, the first block of bits includes a plurality of bits.

In an embodiment, the first block of bits is a Transport Block (TB).

In an embodiment, the first block of bits includes a TB.

In an embodiment, the first signal includes a Code Block (CB).

In an embodiment, the first block of bits includes a Code Block Group (CBG).

In an embodiment, all or some bits in the first block of bits are sequentially output after some or all of CRC attachment, segmentation, coding block-level CRC attachment, channel coding, rate matching, concatenation, scrambling, modulation mapper, layer mapper, transform precoder (for generating complex-valued signals), precoding, resource element mapper, multi-carrier symbol generation, and modulation and up-conversion.

In an embodiment, the first block of bits is used to generate the first wireless signal.

In an embodiment, the first block of bits is used to generate the second wireless signal.

In an embodiment, the first node determines, based on energy detection, whether the second wireless signal is transmitted in the third time-frequency resource pool.

In an embodiment, the first node performs channel decoding on the second wireless signal to determine whether the second wireless signal is transmitted in the third time-frequency resource pool.

In an embodiment, the second wireless signal includes a DeModulation Reference Signal (DMRS), and the first receiving set performs coherent detection on the DMRS in the second wireless signal to determine whether the second wireless signal is transmitted in the third time-frequency resource pool.

In an embodiment, units of the first power value and the second power value are both decibel-milliwatt (dBm).

In an embodiment, units of the first power value and the second power value are both milliwatt (mW).

In an embodiment, the first power value is $P_{PUCCH,b,f,c}(i, q_u, q_d, l)$. $P_{PUCCH,b,f,c}(i, q_u, q_d, l)$ is a transmit power on a PUCCH in a PUCCH transmission period with an index i on a Bandwidth Part (BWP) with an index b on a carrier with an index f of a serving cell with an index c, where $q_u$ is a parameter configuration index, $q_d$ is a reference signal resource index, and/is a power control adjustment state index. The first signaling and the second signaling are both transmitted on a BWP with an index b on a carrier with an index f of a serving cell with an index c. For the specific definition of $P_{PUCCH,b,f,c}(i, q_u, q_d, l)$, see 3GPP TS38.213.

Embodiment 2

Embodiment 2 illustrates a schematic diagram of a network architecture according to an embodiment of the present application, as shown in FIG. 2.

FIG. 2 shows a network architecture 200 of an LTE system, a Long-Term Evolution Advanced (LTE-A) system, and a fixture 5G system. The network architecture 200 of the LTE system, the Long-Term Evolution Advanced (LTE-A) system, and the future 5G system is referred to as an Evolved Packet System (EPS) 200. The EPS 200 may include one or more user equipments (UEs) 201, a UE 241 in sidelink communication with the UE 201, a next-generation radio access network (NG-RAN) 202, a 5G Core Network (5G-CN)/an Evolved Packet Core (EPC) 210, a Home Subscriber Server (HSS) 220, and an Internet service 230. The EPS 200 may be interconnected with other access networks, but the entities, interfaces are not shown for simplicity. As shown in FIG. 2, the EPS 200 provides a packet-switched service. However, those skilled in the art will readily understand that the various concepts presented throughout the present application may be extended to a network that provides a circuit-switched service. The NG-RAN 202 includes a New Radio (NR) Node B (gNB) 203 and another gNB 204. The gNB 203 provides user and control plane protocol termination towards the UE 201. The gNB 203 may be connected to the another gNB 204 via an X2 interface (for example, backhaul). The gNB 203 may also be referred to as a base station, a base transceiver station, a wireless base station, a wireless transceiver, a transceiver function, a basic service set (BSS), an extended service set (ESS), a transmission and reception point (TRP) or another suitable term. The gNB 203 provides the UE 201 with an access point to the 5G-CN/EPC 210. Examples of the UE 201 include a cellular phone, a smart phone, a Session Initiation Protocol (SIP) phone, a laptop computer, a personal digital assistant (PDA), a satellite radio, a global positioning system, a multimedia apparatus, a video apparatus, a digital audio player (such as an MP3 player), a camera, a game console, an unmanned air vehicle, an aircraft, a narrow band-internet of things device, a machine type communication device, a land vehicle, an automobile, a wearable device, or any other apparatuses with similar functions. The UE 201 may also be referred, by a person skilled in the art, to as a mobile station, a subscriber station, a mobile unit, a subscriber unit, a wireless unit, a remote unit, a mobile apparatus, a wireless apparatus, a wireless communications apparatus, a remote apparatus, a mobile subscriber station, an access terminal, a mobile terminal, a wireless terminal, a remote terminal, a handset, a user agent, a mobile client, a client or another suitable term. The gNB 203 is connected to the 5G-CN/EPC 210 via an S1 interface. The 5G-CN/EPC 210 includes a Mobility Management Entity (MME)/Authentication Management Field (AMF)/User Plane Function (UPF) 211, another MIME/AMF/UPF 214, a Service Gateway (S-GW) 212, and a Packet Date Network Gateway (P-GW) 213. The MME/AMF/UPF 211 is a control node that handles signaling between the UE 201 and the 5G-CN/EPC 210. Generally, the MME/AMF/UPF 211 provides bearing and connection management. All user Internet Protocol (IP) packets are transmitted through the S-GW 212, and the S-GW 212 itself is connected to the P-GW 213. The P-GW 213 provides UE IP address allocation and another function. The P-GW 213 is connected to the Internet service 230. The Internet service 230 includes an Internet protocol service corresponding to an operator, and may specifically include Internet, Intranet, an IP Multimedia Subsystem (IMS), and a Packet Switching (PS) service.

In an embodiment, the first node in the present application includes the UE 201.

In an embodiment, the first node in the present application includes the UE 241.

In an embodiment, the second node in the present application includes the UE 241.

In an embodiment, the second node in the present application includes the UE 201.

In an embodiment, the second node in the present application includes the gNB 203.

In an embodiment, the air interface between the UE 201 and the gNB 203 is a Uu interface.

In an embodiment, the wireless link between the UE 201 and the gNB 203 is a cellular link.

In an embodiment, the air interface between the UE 201 and the UE 241 is a PC5 interface.

In an embodiment, the wireless link between the UE 201 and the UE 241 is a sidelink.

In an embodiment, each of the first node in the present application and the second node in the present application is a terminal within a coverage of the gNB 203.

In an embodiment, the first node in the present application is a terminal within a coverage of the gNB 203, and the second node in the present application is a terminal out of the coverage of the gNB 203.

In an embodiment, unicast transmission is supported between the UE 201 and the UE 241.

In an embodiment, broadcast transmission is supported between the UE 201 and the UE 241.

In an embodiment, groupcast transmission is supported between the UE 201 and the UE 241.

In an embodiment, a sender of the first wireless signal in the present application includes the gNB 203.

In an embodiment, the sender of the first wireless signal in the present application includes the UE 201.

In an embodiment, the sender of the first wireless signal in the present application includes the UE 241.

In an embodiment, a sender of the second wireless signal in the present application includes the gNB 203.

In an embodiment, the sender of the second wireless signal in the present application includes the UE 201.

In an embodiment, the sender of the second wireless signal in the present application includes the UE 241.

In an embodiment, a receiver of the first wireless signal in the present application includes the UE 201.

In an embodiment, the receiver of the first wireless signal in the present application includes the UE 241.

In an embodiment, a receiver of the second wireless signal in the present application includes the UE 201.

In an embodiment, the receiver of the second wireless signal in the present application includes the UE 241.

In an embodiment, a sender of the first signaling in the present application includes the UE 201.

In an embodiment, the sender of the first signaling in the present application includes the UE 241.

In an embodiment, a receiver of the first signaling in the present application includes the UE 201.

In an embodiment, the receiver of the first signaling in the present application includes the UE 241.

In an embodiment, the receiver of the first signaling in the present application includes the gNB 203.

In an embodiment, a sender of the second signaling in the present application includes the UE 201.

In an embodiment, the sender of the second signaling in the present application includes the UE 241.

In an embodiment, a receiver of the second signaling in the present application includes the UE 201.

In an embodiment, the receiver of the second signaling in the present application includes the UE 241.

In an embodiment, the receiver of the second signaling in the present application includes the gNB 203.

In an embodiment, a sender of the third signaling in the present application includes the UE 201.

In an embodiment, the sender of the third signaling in the present application includes the UE 241.

In an embodiment, the sender of the third signaling in the present application includes the gNB 203.

In an embodiment, a receiver of the third signaling in the present application includes the UE 201.

In an embodiment, the receiver of the third signaling in the present application includes the UE 241.

In an embodiment, a sender of the fourth signaling in the present application includes the UE 201.

In an embodiment, the sender of the fourth signaling in the present application includes the UE 241.

In an embodiment, the sender of the fourth signaling in the present application includes the gNB 203.

In an embodiment, a receiver of the fourth signaling in the present application includes the UE 201.

In an embodiment, the receiver of the fourth signaling in the present application includes the UE 241.

Embodiment 3

Figure 3:
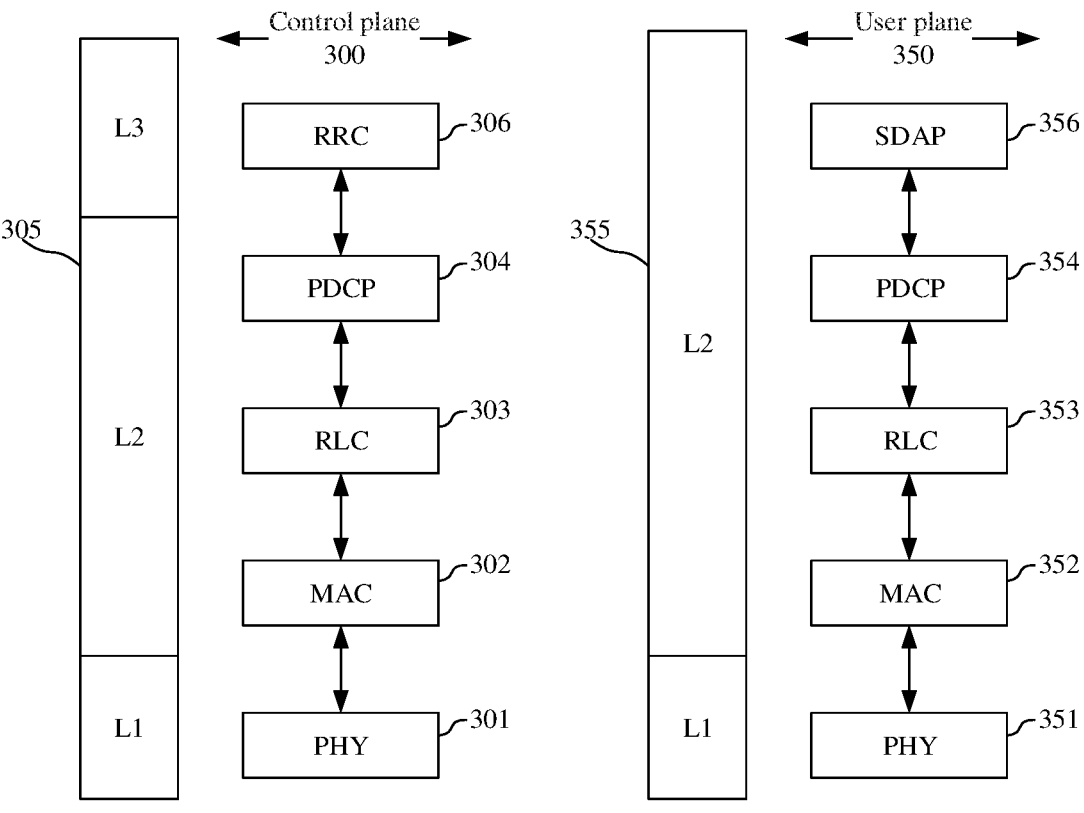
FIG. 3 is a schematic diagram illustrating an embodiment of a radio protocol architecture of each of a user plane and a control plane according to an embodiment of the present application.

Embodiment 3 illustrates a schematic diagram of a radio protocol architecture of each of a user plane and a control plane according to an embodiment of the present application, as shown in FIG. 3. FIG. 3 is a diagram illustrating an embodiment of a radio protocol architecture of each of a user plane 350 and a control plane 300. In FIG. 3, layer 1, layer 2, and layer 3 are used to display the radio protocol architecture of the control plane 300 between a first communication node device (UE, gNB or RSU in V2X) and a second communication node device (gNB, UE or RSU in V2X) or between two UEs. The layer 1 (L1 layer) is the lowest layer, and various physical layer (PHY) signal processing functions are implemented at this layer. The L1 layer is referred to as PHY 301 herein. The layer 2 (L2 layer) 305 is disposed on the PHY 301, and responsible for a link between the first communication node device and the second communication node device and between two UEs through the PHY 301. The L2 layer 305 includes a Medium Access Control (MAC) sublayer 302, a Radio Link Control (RLC) sublayer 303, and a Packet Data Convergence Protocol (PDCP) sublayer 304, and these sublayers are terminated at the second communication node device. The PDCP sublayer 304 provides multiplexing between different radio bearers and a logical channel. The PDCP sublayer 304 further provides security by encrypting a data packet, and provides handoff support for the first communication node device between second communication node devices. The RLC sublayer 303 provides segmentation and reassembly of upper layer data packets, retransmission of a lost data packet, and reordering of data packets to compensate for out-of-order reception due to HARQ. The MAC sublayer 302 provides multiplexing between a logical channel and a transport channel. The MAC sublayer 302 is further responsible for allocating, between first communication node devices, various radio resources (for example, resource blocks) in a cell. The MAC sublayer 302 is further responsible for a HARQ operation. A Radio Resource Control (RRC) sublayer 306 in the layer 3 (L3 layer) in the control plane 300 is responsible for obtaining a radio resource (namely, a radio bearer) and configuring a lower layer by using RRC signaling between the second communication node device and the first communication node device. The radio protocol architecture of the user plane 350 includes a Layer 1 (L1 layer) and a Layer 2 (L2 layer). A physical layer 351, a PDCP sublayer 354 in the L2 layer 355, an RLC sublayer 353 in the L2 layer 355, and a MAC sublayer 352 in the L2 layer 355 of the radio protocol architecture, used for the first communication node device and the second communication node device, in the user plane 350 are substantially the same as the corresponding layers and sublayers in the control plane 300, but the PDCP sublayer 354 further provides header compression used for an upper layer data packet to reduce wireless transmission overheads. The L2 layer 355 in the user plane 350 further includes a Service Data Adaptation Protocol (SDAP) sublayer 356, and the SDAP sublayer 356 is responsible for mapping between QoS flows and data radio bearers (DRBs), to support diversification of services. Although not shown in the figure, the first communication node device may be provided with several upper layers above the L2 layer 355, including a network layer (for example, an IP layer) terminating at the P-GW on the network side and an application layer terminating at the other end of connection (for example, a remote UE, and a server).

In an embodiment, the radio protocol architectures in FIG. 3 are applicable to the first node in the present application.

In an embodiment, the radio protocol architectures in FIG. 3 are applicable to the second node in the present application.

In an embodiment, the first wireless signal in the present application is generated at the PHY 301 or the PHY 351.

In an embodiment, the second wireless signal in the present application is generated at the PHY 301 or the PHY 351.

In an embodiment, the first signaling in the present application is generated at the PHY 301 or the PHY 351.

In an embodiment, the second signaling in the present application is generated at the PHY 301 or the PHY 351.

In an embodiment, the third signaling in the present application is generated at the PHY 301 or the PHY 351.

In an embodiment, the fourth signaling in the present application is generated at the PHY 301 or the PHY 351.

In an embodiment, a first signaling block in the present application is generated at the MAC sublayer 302 or the MAC sublayer 352.

In an embodiment, a second signaling block in the present application is generated at the MAC sublayer 302 or the MAC sublayer 352.

In an embodiment, a third signaling block in the present application is generated at the MAC sublayer 302 or the MAC sublayer 352.

In an embodiment, a fourth signaling block in the present application is generated at the MAC sublayer 302 or the MAC sublayer 352.

In an embodiment, the fourth signaling block in the present application is generated at the RRC sublayer 306.

Embodiment 4

Figure 4:
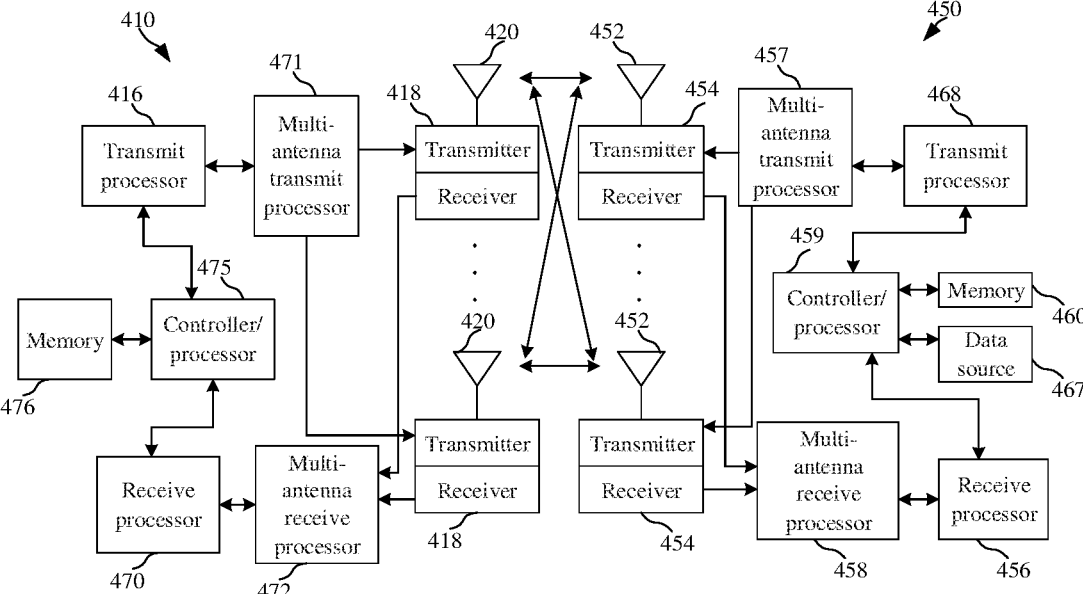
FIG. 4 is a schematic diagram of a first communications device and a second communications device according to an embodiment of the present application.

Embodiment 4 illustrates a schematic diagram of a first communications device and a second communications device according to an embodiment of the present application, as shown in FIG. 4. FIG. 4 is a block diagram of a first communications device 410 and a second communications device 450 communicating with each other in an access network.

The first communications device 410 includes a controller/processor 475, a memory 476, a receive processor 470, a transmit processor 416, a multi-antenna receive processor 472, a multi-antenna transmit processor 471, transmitters/receivers 418, and antennas 420.

The second communications device 450 includes a controller/processor 459, a memory 460, a data source 467, a transmit processor 468, a receive processor 456, a multi-antenna transmit processor 457, a multi-antenna receive processor 458, transmitters/receivers 454, and antennas 452.

In transmission from the first communications device 410 to the second communications device 450, at the second communications device 410, an upper layer data packet from a core network is provided to the controller/processor 475. The controller/processor 475 implements functions of the L2 layer. During DL, the controller/processor 475 provides header compression, encryption, packet segmentation and reordering, multiplexing between a logical channel and a transport channel, and radio resource allocation of the second communications device 450 based on various priority measurements. The controller/processor 475 is further responsible for a HARQ operation, retransmission of a lost packet, and signaling to the second communications device 450. The transmit processor 416 and the multi-antenna transmit processor 471 implement various signal processing functions of an L1 layer (namely, a physical layer). The transmit processor 416 implements encoding and interleaving to facilitate forward error correction (FEC) at the second communications device 450, and mapping of constellation based on various modulation schemes (such as binary phase shift keying (BPSK), quadrature phase shift keying (QPSK), M-phase shift keying (M-PSK), and M-quadrature amplitude modulation (M-QAM)). The multi-antenna transmit processor 471 performs digital space precoding, including codebook-based precoding and non-codebook-based precoding, on a coded and modulated symbol, and beamforming processing, to generate one or more parallel streams. The transmit processor 416 subsequently maps each parallel stream to a subcarrier, multiplexes the modulated symbol with a reference signal (for example, a pilot) in time domain and/or frequency domain, and then uses an inverse fast Fourier transform (IFFT) to generate a physical channel that carries a time-domain multi-carrier symbol stream. Subsequently, the multi-antenna transmit processor 471 performs an operation of analog precoding transmitting/beamforming on the time-domain multi-carrier symbol stream. Each transmitter 418 converts a baseband multi-carrier symbol stream provided by the multi-antenna transmit processor 471 into a radio frequency stream, and then provides the radio frequency stream for different antennas 420.

In the transmission from the first communications device 410 to the second communications device 450, at the second communications device 450, each receiver 454 receives a signal through its corresponding antenna 452. Each receiver 454 recovers information modulated onto a radio frequency carrier, converts a radio frequency stream into a baseband multi-carrier symbol stream, and provides the baseband multi-carrier symbol stream for the receive processor 456. The receive processor 456 and the multi-antenna receive processor 458 implement various signal processing functions of the L1 layer. The multi-antenna receive processor 458 performs an operation of analog precoding receiving/beamforming on the baseband multi-carrier symbol stream from the receiver 454. The receive processor 456 converts, from time domain to frequency domain via fast Fourier transform (FFT), the baseband multi-carrier symbol stream obtained after the operation of analog precoding receiving/beamforming. In frequency domain, a physical-layer data signal and a reference signal are demultiplexed by the receive processor 456. The reference signal is used for channel estimation, and the data signal is recovered after multi-antenna detection performed by the multi-antenna receive processor 458, to obtain any parallel stream that uses the second communications device 450 as a destination. Symbols on each parallel stream are demodulated and recovered in the receive processor 456 to generate a soft decision. The receive processor 456 then decodes and de-interleaves the soft decision to recover upper layer data and a control signal transmitted by the first communications device 410 on a physical channel. The upper layer data and the control signal are then provided to the controller/processor 459. The controller/processor 459 implements functions of the L2 layer. The controller/processor 459 may be associated with the memory 460 that stores a program code and data. The memory 460 may be referred to as a computer-readable medium. During DL, the controller/processor 459 provides demultiplexing between a transport channel and a logic channel, packet reassembly, decryption, header decompression, and control signal processing, to recover an upper layer data packet from a core network. The upper layer packet is then provided to all protocol layers above the L2 layer, or various control signals may be provided to the L3 layer for processing by the L3 layer. The controller/processor 459 is further responsible for performing error detection by using a positive acknowledgment (ACK) protocol and/or a negative acknowledgment (NACK) protocol to support the HARQ operation.

In transmission from the second communications device 450 to the first communications device 410, at the second communications device 450, an upper layer data packet is provided to the controller/processor 459 by using the data source 467. The data source 467 represents all protocol layers above the L2 layer. Similar to the transmit function at the first communications device 410 described in DL, the controller/processor 459 implements header compression, encryption, packet segmentation and reordering, and multiplexing between a logical channel and a transport channel based on radio resource allocation of the first communications device 410, to implement L2 layer functions for a user plane and a control plane. The controller/processor 459 is further responsible for a HARQ operation, retransmission of a lost packet, and signaling to the first communications device 410. The transmit processor 468 performs modulation mapping and channel coding processing. The multi-antenna transmit processor 457 performs digital multi-antenna spatial precoding, including codebook-based precoding and non-codebook-based precoding, and beamforming processing. Subsequently, the transmit processor 468 modulates the generated parallel stream into a multi-carrier/single-carrier symbol stream, and the multi-carrier/single-carrier symbol stream is provided to different antennas 452 via the transmitter 454 after undergoing an analog precoding/beamforming operation in the multi-antenna transmit processor 457. Each transmitter 454 first converts a baseband symbol stream provided by the multi-antenna transmit processor 457 into a radio frequency symbol stream, and then provides the radio frequency symbol stream for the antennas 452.

In the transmission from the second communications device 450 to the first communications device 410, a function at the first communications device 410 is similar to the receive function at the second communications device 450 described in the transmission from the first communications device 410 to the second communications device 450. Each receiver 418 receives a radio frequency signal through its corresponding antenna 420, converts the received radio frequency signal into a baseband signal, and provides the baseband signal for the multi-antenna receive processor 472 and the receive processor 470. The receive processor 470 and the multi-antenna receive processor 472 jointly implement functions of the L1 layer. The controller/processor 475 implements functions of the L2 layer. The controller/processor 475 may be associated with the memory 476 that stores a program code and data. The memory 476 may be referred to as a computer-readable medium. The controller/processor 475 provides demultiplexing between a transport channel and a logic channel, packet reassembly, decryption, header decompression, and control signal processing to recover an upper layer data packet obtained from the second communications device 450. The upper layer data packet obtained from the controller/processor 475 may be provided to a core network. The controller/processor 475 is further responsible for performing error detection by using an ACK protocol and/or a NACK protocol to support the HARQ operation.

In an embodiment, the second communications device 450 includes at least one processor and at least one memory. The at least one memory includes computer program code. The at least one memory and the computer program code are configured to be used together with the at least one processor. The second communications device 450 is at least configured to: send the first wireless signal of the present application in the first time-frequency resource pool of the present application, where the first wireless signal carries the first block of bits in the present application; monitor the first signaling of the present application in the second time-frequency resource pool of the present application, where the first signaling is used to indicate whether the first block of bits is correctly decoded; when the first signaling is detected and the first signaling indicates that the first block of bits is correctly decoded, maintain zero transmit power in the third time-frequency resource pool of the present application; when the first signaling is detected and the first signaling indicates that the first block of bits is not correctly decoded, send the second wireless signal of the present application in the third time-frequency resource pool, and monitor the second signaling of the present application in the fourth time-frequency resource pool of the present application, where a transmit power of the second signaling is the first power value in the present application; and when the first signaling is not detected, send the second wireless signal in the third time-frequency resource pool, and monitor the second signaling in the fourth time-frequency resource pool, where the transmit power of the second signaling is the first power value or the second power value in the present application. The second wireless signal carries the first block of bits; the second signaling is used to indicate whether the first block of bits is correctly decoded; and the second power value is greater than the first power value.

In an embodiment, the second communications device 450 includes: a memory for storing a computer-readable instruction program, where the computer-readable instruction program generates actions when being executed by at least one processor, and the actions include: sending the first wireless signal of the present application in the first time-frequency resource pool of the present application, where the first wireless signal carries the first block of bits in the present application; monitoring the first signaling of the present application in the second time-frequency resource pool of the present application, where the first signaling is used to indicate whether the first block of bits is correctly decoded; when the first signaling is detected and the first signaling indicates that the first block of bits is correctly decoded, maintaining zero transmit power in the third time-frequency resource pool of the present application; when the first signaling is detected and the first signaling indicates that the first block of bits is not correctly decoded, sending the second wireless signal of the present application in the third time-frequency resource pool, and monitoring the second signaling of the present application in the fourth time-frequency resource pool of the present application, where a transmit power of the second signaling is the first power value in the present application; and when the first signaling is not detected, sending the second wireless signal in the third time-frequency resource pool, and monitoring the second signaling in the fourth time-frequency resource pool, where the transmit power of the second signaling is the first power value or the second power value in the present application. The second wireless signal carries the first block of bits; the second signaling is used to indicate whether the first block of bits is correctly decoded; and the second power value is greater than the first power value.

In an embodiment, the first communications device 410 includes least one processor and at least one memory. The at least one memory includes computer program code. The at least one memory and the computer program code are configured to be used together with the at least one processor. The first communications device 410 apparatus is at least configured to: receive the first wireless signal of the present application in the first time-frequency resource pool of the present application, where the first wireless signal carries the first block of bits in the present application; send the first signaling of the present application in the second time-frequency resource pool of the present application, where the first signaling is used to indicate whether the first block of bits is correctly decoded; monitor the second wireless signal of the present application in the third time-frequency resource pool of the present application, where the second wireless signal carries the first block of bits; when the first signaling indicates that the first block of bits is not correctly decoded, send the second signaling of the present application in the fourth time-frequency resource pool of the present application by using the first power value in the present application; when the first signaling indicates that the first block of bits is correctly decoded and the second wireless signal is detected, send the second signaling in the fourth time-frequency resource pool by using the second power value in the present application; and when the first signaling indicates that the first block of bits is correctly decoded and the second wireless signal is not detected, maintain zero transmit power in the fourth time-frequency resource pool. The second signaling is used to indicate whether the first block of bits is correctly decoded, and the second power value is greater than the first power value.

In an embodiment, the first communications device 410 includes: a memory for storing a computer-readable instruction program, where the computer-readable instruction program generates actions when being executed by at least one processor, and the actions include: receiving the first wireless signal of the present application in the first time-frequency resource pool of the present application, where the first wireless signal carries the first block of bits in the present application; sending the first signaling of the present application in the second time-frequency resource pool of the present application, where the first signaling is used to indicate whether the first block of bits is correctly decoded; monitoring the second wireless signal of the present application in the third time-frequency resource pool of the present application, where the second wireless signal carries the first block of bits; when the first signaling indicates that the first block of bits is not correctly decoded, sending the second signaling of the present application in the fourth time-frequency resource pool of the present application by using the first power value in the present application; when the first signaling indicates that the first block of bits is correctly decoded and the second wireless signal is detected, sending the second signaling in the fourth time-frequency resource pool by using the second power value in the present application; and when the first signaling indicates that the first block of bits is correctly decoded and the second wireless signal is not detected, maintaining zero transmit power in the fourth time-frequency resource pool. The second signaling is used to indicate whether the first block of bits is correctly decoded, and the second power value is greater than the first power value.

In an embodiment, the first communications device 410 includes least one processor and at least one memory. The at least one memory includes computer program code. The at least one memory and the computer program code are configured to be used together with the at least one processor. The first communications device 410 apparatus is at least configured to: receive the third signaling of the present application, where the third signaling includes scheduling information of the first block of bits in the present application.

In an embodiment, the first communications device 410 includes: a memory for storing a computer-readable instruction program, where the computer-readable instruction program generates actions when being executed by at least one processor, and the actions include: receiving the third signaling of the present application, where the third signaling includes scheduling information of the first block of bits in the present application.

In an embodiment, the first communications device 410 includes least one processor and at least one memory. The at least one memory includes computer program code. The at least one memory and the computer program code are configured to be used together with the at least one processor. The first communications device 410 apparatus is at least configured to: receive the fourth signaling in the present application, where the fourth signaling is used to determine a difference between the first power value in the present application and the second power value in the present application.

In an embodiment, the first communications device 410 includes: a memory for storing a computer-readable instruction program, where the computer-readable instruction program generates actions when being executed by at least one processor, and the actions include: receiving the fourth signaling in the present application, where the fourth signaling is used to determine a difference between the first power value in the present application and the second power value in the present application.

In an embodiment, the first node in the present application includes the first communications device 410.

In an embodiment, the second node in the present application includes the second communications device 450.

In an embodiment, the second communications device 450 is UE.

In an embodiment, the second communications device 450 is a base station.

In an embodiment, the first communications device 410 is UE.

In an embodiment, at least one of the antenna 452, the receiver 454, the receive processor 456, the multi-antenna receive processor 458, the controller/processor 459, the memory 460, and the data source 467 is configured to send the first wireless signal in the present application; and at least one of the antenna 420, the transmitter 418, the transmit processor 416, the multi-antenna transmit processor 471, the controller/processor 475, and the memory 476 is configured to receive the first wireless signal in the present application.

In an embodiment, at least one of the antenna 452, the receiver 454, the receive processor 456, the multi-antenna receive processor 458, the controller/processor 459, the memory 460, and the data source 467 is configured to send the second wireless signal in the present application; and at least one of the antenna 420, the transmitter 418, the transmit processor 416, the multi-antenna transmit processor 471, the controller/processor 475, and the memory 476 is configured to receive the second wireless signal in the present application.

In an embodiment, at least one of the antenna 452, the receiver 454, the receive processor 456, the multi-antenna receive processor 458, the controller/processor 459, the memory 460, and the data source 467 is configured to receive the first signaling in the present application; and at least one of the antenna 420, the transmitter 418, the transmit processor 416, the multi-antenna transmit processor 471, the controller/processor 475, and the memory 476 is configured to send the first signaling in the present application.

In an embodiment, at least one of the antenna 452, the receiver 454, the receive processor 456, the multi-antenna receive processor 458, the controller/processor 459, the memory 460, and the data source 467 is configured to receive the second signaling in the present application; and at least one of the antenna 420, the transmitter 418, the transmit processor 416, the multi-antenna transmit processor 471, the controller/processor 475, and the memory 476 is configured to send the second signaling in the present application.

In an embodiment, at least one of the antenna 452, the receiver 454, the receive processor 456, the multi-antenna receive processor 458, the controller/processor 459, the memory 460, and the data source 467 is configured to send the third signaling in the present application; and at least one of the antenna 420, the transmitter 418, the transmit processor 416, the multi-antenna transmit processor 471, the controller/processor 475, and the memory 476 is configured to receive the third signaling in the present application.

In an embodiment, at least one of the antenna 452, the receiver 454, the receive processor 456, the multi-antenna receive processor 458, the controller/processor 459, the memory 460, and the data source 467 is configured to send the fourth signaling in the present application; and at least one of the antenna 420, the transmitter 418, the transmit processor 416, the multi-antenna transmit processor 471, the controller/processor 475, and the memory 476 is configured to receive the fourth signaling in the present application.

Embodiment 5

Figure 5:
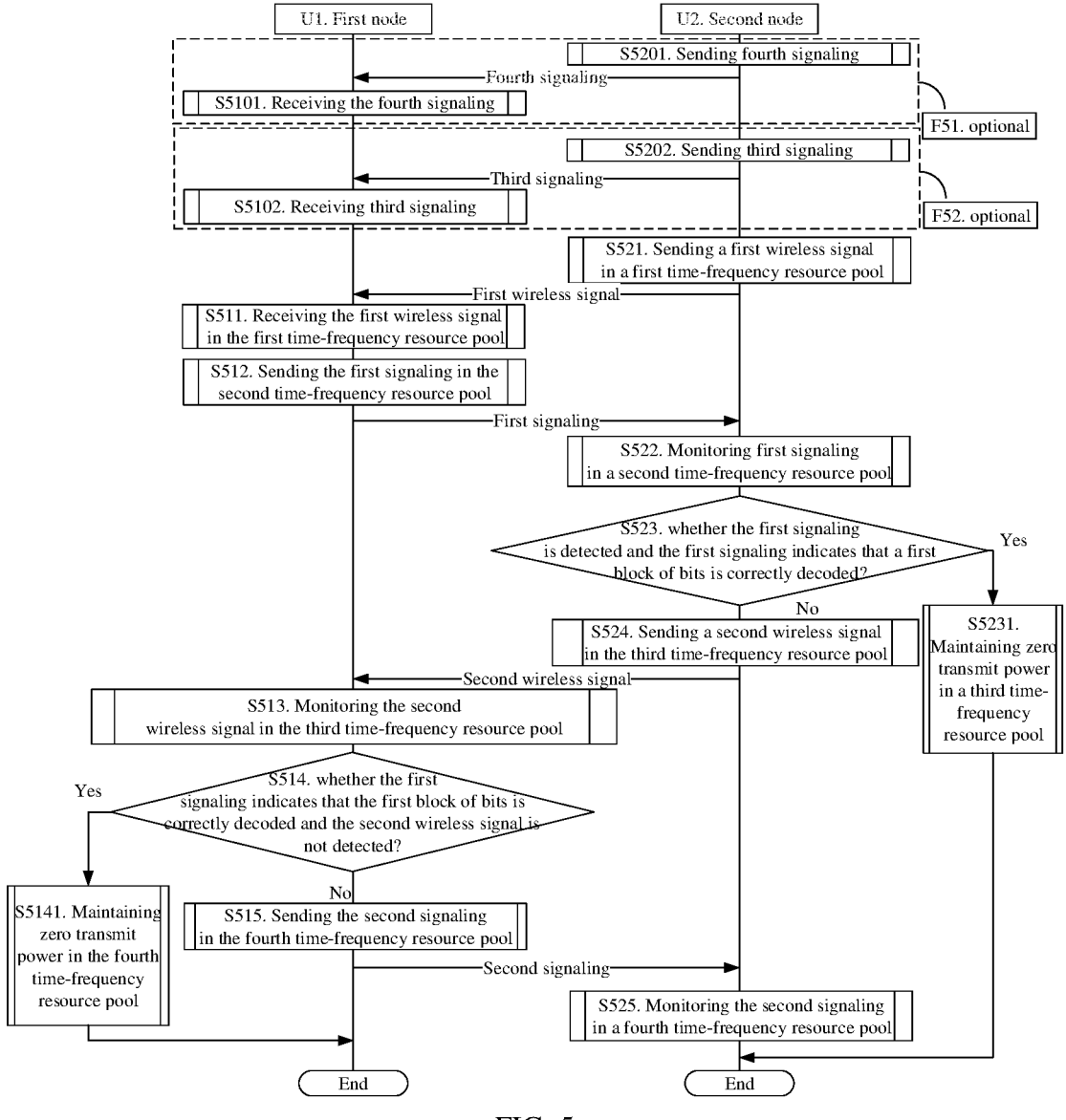
FIG. 5 is a flowchart of transmission according to an embodiment of the present application.

Embodiment 5 illustrates a flowchart of wireless transmission according to an embodiment of the present application, as shown in FIG. 5. In FIG. 5, a first node U1 communicates with a second node U2 through an air interface. The parts marked as F51 and F52 in the figure are optional.

The second node U2 sends fourth signaling in Step S5201; sends third signaling in Step S5202; sends a first wireless signal in a first time-frequency resource pool in Step S521; monitors first signaling in a second time-frequency resource pool in Step S522; performs determination in Step S523, and if the first signaling is detected and the first signaling indicates that a first block of bits is correctly decoded, maintains zero transmit power in a third time-frequency resource pool in Step S5231; otherwise, sends a second wireless signal in the third time-frequency resource pool in Step S524; and monitors the second signaling in a fourth time-frequency resource pool in Step S525.

The first node U1 receives the fourth signaling in Step S5101; receives the third signaling in Step S5102; receives the first wireless signal in the first time-frequency resource pool in Step S511; sends the first signaling in the second time-frequency resource pool in Step S512; monitors the second wireless signal in the first time-frequency resource pool in Step S513; performs determination in Step S514, and if the first signaling indicates that the first block of bits is correctly decoded and the second wireless signal is not detected, maintains zero transmit power in the fourth time-frequency resource pool in Step S5141; and otherwise, sends the second signaling in the fourth time-frequency resource pool in Step S515.

In Embodiment 5, the first wireless signal carries the first block of bits. The first signaling is used to indicate whether the first block of bits is correctly decoded, and the second wireless signal carries the first block of bits. When the first signaling indicates that the first block of bits is not correctly decoded, the first node U1 sends the second signaling in the fourth time-frequency resource pool by using a first power value. When the first signaling indicates that the first block of bits is correctly decoded and the second wireless signal is detected, the first node U1 sends the second signaling in the fourth time-frequency resource pool by using a second power value. When the first signaling is detected and the first signaling indicates that the first block of bits is not correctly decoded, the second node U2 monitors the second signaling in the fourth time-frequency resource pool, and a transmit power of the second signaling is the first power value. When the first signaling is not detected, the second node U2 monitors the second signaling in the fourth time-frequency resource pool, and a transmit power of the second signaling is the first power value or the second power value. The second signaling is used to indicate whether the first block of bits is correctly decoded, and the second power value is greater than the first power value. The third signaling includes scheduling information of the first block of bits, and the fourth signaling is used to determine a difference between the second power value and the first power value.

In an embodiment, the first node U1 is the first node in the present application.

In an embodiment, the second node U2 is the second node in the present application.

In an embodiment, an air interface between the second node U2 and the first node U1 is a Uu interface.

In an embodiment, the air interface between the second node U2 and the first node U1 includes a cellular link.

In an embodiment, the air interface between the second node U2 and the first node U1 includes a wireless interface between a base station device and user equipment.

In an embodiment, the air interface between the second node U2 and the first node U1 includes a wireless interface between a relay node and user equipment.

In an embodiment, the air interface between the second node U2 and the first node U1 is a PC5 interface.

In an embodiment, the air interface between the second node U2 and the first node U1 includes a sidelink.

In an embodiment, the air interface between the second node U2 and the first node U1 includes a wireless interface between user equipments.

In an embodiment, the first node in the present application is a terminal.

In an embodiment, the first node in the present application is a car.

In an embodiment, the first node in the present application is a vehicle.

In an embodiment, the first node in the present application is a Road Side Unit (RSU).

In an embodiment, the second node in the present application is a terminal.

In an embodiment, the second node in the present application is a car.

In an embodiment, the second node in the present application is a vehicle.

In an embodiment, the second node in the present application is an RSU.

In an embodiment, the second node in the present application is a base station.

In an embodiment, the phrase of maintaining zero transmit power in a third time-frequency resource pool includes: performing channel measurement in the third time-frequency resource pool.

In an embodiment, the phrase of maintaining zero transmit power in a third time-frequency resource pool includes: releasing a cache for storing the first block of bits.

In an embodiment, the phrase of maintaining zero transmit power in a fourth time-frequency resource pool includes: performing channel measurement in the fourth time-frequency resource pool.

In an embodiment, when the first signaling is not detected, the second node U2 monitors the second signaling in the fourth time-frequency resource pool based on that the transmit power of the second signaling is the second power value.

In a sub-embodiment of the foregoing embodiment, the second signaling includes a signature sequence. The phrase of "based on that the transmit power of the second signaling is the second power value" includes that: the second node U2 adjusts a Power Amplifier (PA) based on that the transmit power of the second signaling is the second power value.

In a sub-embodiment of the foregoing embodiment, the second signaling includes a signature sequence. The phrase of "based on that the transmit power of the second signaling is the second power value" includes that: the second node U2 performs coherent detection on the signature sequence, determines a target threshold based on the assumption that the transmit power of the second signaling is the second power value, and determines whether the second signaling is received based on a comparison between the target threshold and a result of the coherent detection performed on the signature sequence.

In an embodiment, a unit of the target threshold is mW.

In an embodiment, a unit of the target threshold is dBm.

In an embodiment, when the second signaling is ACK, the signature sequence included in the second signaling is a first sequence; when the second signaling is NACK, the signature sequence included in the second signaling is a second sequence.

In an embodiment, the first sequence is a Zadoff-Chu (ZC) sequence.

In an embodiment, the first sequence includes a positive integer number of elements, and any element included in the first sequence is a complex number.

In an embodiment, the second sequence is a ZC sequence.

In an embodiment, the second sequence includes a positive integer number of elements, and any element included in the first sequence is a complex number.

In an embodiment, when the first signaling is not detected, the second node U2 performs coherent detection on a DMRS associated with the second signaling to determine whether the transmit power of the second signaling is the first power value or the second power value, and then detects the second signaling.

In an embodiment, the second signaling is sent on one PSFCH, and the DMRS associated with the second signaling includes a DMRS associated with a PSSCH of the one PSFCH.

In an embodiment, the DMRS associated with the second signaling includes a DMRS of a physical layer channel occupied by the second signaling.

In an embodiment, the third signaling explicitly indicates the scheduling information of the first block of bits.

In an embodiment, the third signaling implicitly indicates the scheduling information of the first block of bits.

In an embodiment, the third signaling is sent on a Physical Sidelink Control Channel (PSCCH).

In an embodiment, the third signaling is transmitted through a PC5 interface.

In an embodiment, the third signaling includes Sidelink Control Information (SCI).

In an embodiment, the third signaling includes one or more fields in one piece of SCI.

In an embodiment, the third signaling is sent on a Physical Downlink Control Channel (PDCCH).

In an embodiment, the third signaling is transmitted through a Uu interface.

In an embodiment, the third signaling includes Downlink Control Information (DCI).

In an embodiment, the third signaling includes one or more fields in one piece of DCI.

In an embodiment, the scheduling information of the first block of bits includes the first time-frequency resource pool and the third time-frequency resource pool.

In an embodiment, the scheduling information of the first block of bits includes a Modulation Coding Status (MCS) of the first wireless signal.

In an embodiment, the scheduling information of the first block of bits includes a Redundancy Version (RV) of the first wireless signal.

In an embodiment, the scheduling information of the first block of bits includes a HARQ process number corresponding to the first wireless signal.

In an embodiment, an MCS of the second wireless signal is the same as the MCS of the first wireless signal.

In an embodiment, an RV of the second wireless signal is associated to the RV of the first wireless signal, that is, the RV of the second wireless signal is implicitly indicated by the RV of the first wireless signal.

In an embodiment, the fourth signaling is higher layer signaling.

In an embodiment, the fourth signaling is broadcasted.

In an embodiment, the fourth signaling is physical layer signaling.

In an embodiment, the fourth signaling is transmitted through a PC5 interface.

In an embodiment, the fourth signaling is transmitted through a Uu interface.

In an embodiment, the fourth signaling explicitly indicates the difference between the second power value and the first power value.

In an embodiment, the fourth signaling implicitly indicates the difference between the second power value and the first power value.

In an embodiment, the steps in block F51 in FIG. 5 exist.

In an embodiment, the steps in block F51 in FIG. 5 do not exist.

In an embodiment, the steps in block F52 in FIG. 5 exist.

In an embodiment, the steps in block F52 in FIG. 5 do not exist.

In an embodiment, the steps in block F51 and the steps in block F52 in FIG. 5 exist, and the steps in block F51 are performed before the steps in block F52.

In an embodiment, the steps in block F51 and the steps in block F52 in FIG. 5 exist, and the steps in block F51 are performed after the steps in block F52.

Embodiment 6

Embodiment 6 illustrates a schematic diagram of a process for determining whether second signaling is transmitted in a fourth time-frequency resource pool according to an embodiment of the present application, as shown in FIG. 6.

In Embodiment 6, the first node in the present application determines whether the fourth time-frequency resource pool is reserved for a first type of transmission in step S61, and if so, Step S63 is performed, namely, skipping sending of the second signaling in the fourth time-frequency resource pool; otherwise, Step S62 is performed, namely, when first signaling indicates that a first block of bits is not correctly decoded or a second wireless signal is detected, sending the second signaling in the fourth time-frequency resource pool. In particular, the protection scope of the present application is the branch flow from Step S61 to Step S62.

In Embodiment 6, the first signaling is used to indicate whether the first block of bits is correctly decoded; the second wireless signal carries the first block of bits; and the second signaling is used to indicate whether the first block of bits is correctly decoded.

In an embodiment, a transmission channel corresponding to the first block of bits is a Sidelink Shared Channel (SL-SCH), and the first type of transmission includes uplink transmission.

In an embodiment, the transmission channel corresponding to the first block of bits is an SL-SCH, and the first type of transmission includes HARQ-ACK for the first transmission of a transport block other than the first block of bits on the SL-SCH.

In an embodiment, the first type of transmission includes HARQ-ACK for the first transmission of a transport block.

In an embodiment, the first type of transmission is carried by physical layer signaling.

In an embodiment, the first type of transmission is carried by Medium Access Control Layer Control Element (MAC CE) signaling.

In an embodiment, the first type of transmission is transmitted on a PSFCH.

In an embodiment, when the fourth time-frequency resource pool is reserved for the first type of transmission, the first type of transmission is sent in the fourth time-frequency resource pool.

In an embodiment, when the fourth time-frequency resource pool is reserved for the first type of transmission, the first type of transmission is not sent in the fourth time-frequency resource pool.

Embodiment 7

Embodiment 7 illustrates a schematic diagram of a relationship between a second power value and a first power value according to an embodiment of the present application, as shown in FIG. 7.

In an embodiment, a difference δ between the second power value and the first power value is fixed.

In an embodiment, the difference δ between the second power value and the first power value is a positive real number.

In an embodiment, the difference δ between the second power value and the first power value is preconfigured.

In an embodiment, a unit of the difference δ between the second power value and the first power value is decibel (dB).

In an embodiment, the unit of the difference δ between the second power value and the first power value is mW.

Embodiment 8

Embodiment 8 illustrates a schematic diagram of a time-domain relationship between a first wireless signal, a second wireless signal, first signaling, second signaling, third signaling, and fourth signaling according to an embodiment of the present application, as shown in FIG. 8. In particular, in FIG. 8, a sequence of a time domain resource occupied by the third signaling and a time domain resource occupied by the fourth signaling does not represent a specific time sequence therebetween.

In an embodiment, the time domain resource occupied by the third signaling, the time domain resource occupied by the fourth signaling, a time domain resource occupied by the first wireless signal, a time domain resource occupied by the first signaling, a time domain resource occupied by the second wireless signal, and a time domain resource occupied by the second signaling are arranged in sequence in time domain, and any two of them do not overlap in time domain.

In an embodiment, the time domain resource occupied by the fourth signaling, the time domain resource occupied by the third signaling, the time domain resource occupied by the first wireless signal, the time domain resource occupied by the first signaling, the time domain resource occupied by the second wireless signal, and the time domain resource occupied by the second signaling are arranged in sequence in time domain, and any two of them do not overlap in time domain.

In an embodiment, the time domain resource occupied by the fourth signaling is arranged after the time domain resource occupied by the third signaling, and the time domain resource occupied by the fourth signaling is arranged before the time domain resource occupied by the first wireless signal.

In an embodiment, the time domain resource occupied by the third signaling is arranged after the time domain resource occupied by the fourth signaling, and the time domain resource occupied by the third signaling is arranged before the time domain resource occupied by the first wireless signal.

In an embodiment, the time domain resource occupied by the third signaling is the same as the time domain resource occupied by the fourth signaling.

In an embodiment, the time domain resource occupied by the third signaling overlap with the time domain resource occupied by the fourth signaling.

In an embodiment, the time domain resource occupied by the first signaling is arranged after the time domain resource occupied by the first wireless signal, and the time domain resource occupied by the first signaling is arranged before the time domain resource occupied by the second wireless signal.

In an embodiment, the time domain resource occupied by the second signaling is arranged after the time domain resource occupied by the second wireless signal.

In an embodiment, the third signaling includes scheduling information of a first block of bits, and the scheduling information of the first block of bits includes the time domain resource occupied by the first wireless signal and the time domain resource occupied by the second wireless signal.

In an embodiment, the third signaling includes scheduling information of a first block of bits, and the scheduling information of the first block of bits includes a frequency domain resource occupied by the first wireless signal and a frequency domain resource occupied by the second wireless signal.

In an embodiment, the time domain resource occupied by the third signaling, the time domain resource occupied by the fourth signaling, the time domain resource occupied by the first wireless signal, the time domain resource occupied by the first signaling, the time domain resource occupied by the second wireless signal, and the time domain resource occupied by the second signaling each includes a positive integer number of Orthogonal Frequency Division Multiplexing (OFDM) symbols.

In an embodiment, the time domain resource occupied by the third signaling, the time domain resource occupied by the fourth signaling, the time domain resource occupied by the first wireless signal, the time domain resource occupied by the first signaling, the time domain resource occupied by the second wireless signal, and the time domain resource occupied by the second signaling each includes a positive integer number of slots.

In an embodiment, the time domain resource occupied by the third signaling, the time domain resource occupied by the fourth signaling, the time domain resource occupied by the first wireless signal, the time domain resource occupied by the first signaling, the time domain resource occupied by the second wireless signal, and the time domain resource occupied by the second signaling each includes a positive integer number of subframes.

In an embodiment, the time domain resource occupied by the third signaling, the time domain resource occupied by the fourth signaling, the time domain resource occupied by the first wireless signal, the time domain resource occupied by the first signaling, the time domain resource occupied by the second wireless signal, and the time domain resource occupied by the second signaling each includes a positive integer number of milliseconds (ms).

Embodiment 9

Embodiment 9 illustrates a schematic diagram of a relationship between a first time-frequency resource pool, a second time-frequency resource pool, a third time-frequency resource pool, and a fourth time-frequency resource pool according to an embodiment of the present application, as shown in FIG. 9. In FIG. 9, a rectangle filled with diagonal stripes represents a time-frequency resource pool.

In an embodiment, the first time-frequency resource pool, the second time-frequency resource pool, the third time-frequency resource pool, and the fourth time-frequency resource pool are arranged in sequence in time domain, and any two of the time-frequency resource pools do not overlap in time domain.

In an embodiment, in time domain, the second time-frequency resource pool is arranged after the first time-frequency resource pool, and the second time-frequency resource pool is arranged before the third time-frequency resource pool.

In an embodiment, the first time-frequency resource pool, the second time-frequency resource pool, the third time-frequency resource pool, and the fourth time-frequency resource pool each includes a positive integer number of OFDM symbols in time domain.

In an embodiment, the first time-frequency resource pool, the second time-frequency resource pool, the third time-frequency resource pool, and the fourth time-frequency resource pool each includes a positive integer number of slots in time domain.

In an embodiment, the first time-frequency resource pool, the second time-frequency resource pool, the third time-frequency resource pool, and the fourth time-frequency resource pool each includes a positive integer number of subframes in time domain.

In an embodiment, the first time-frequency resource pool, the second time-frequency resource pool, the third time-frequency resource pool, and the fourth time-frequency resource pool each includes a positive integer number of milliseconds in time domain.

In an embodiment, the first time-frequency resource pool, the second time-frequency resource pool, the third time-frequency resource pool, and the fourth time-frequency resource pool each includes a plurality of consecutive subcarriers in frequency domain.

In an embodiment, the second time-frequency resource pool and the fourth time-frequency resource pool are respectively associated with the first time-frequency resource pool and the third time-frequency resource pool.

In an embodiment, the first time-frequency resource pool, the second time-frequency resource pool, the third time-frequency resource pool, and the fourth time-frequency resource pool each includes a positive integer number of Resource Elements (REs).

In an embodiment, the first time-frequency resource pool, the second time-frequency resource pool, the third time-frequency resource pool, and the fourth time-frequency resource pool each includes a positive integer number of Resource Blocks (RBs).

In an embodiment, the first time-frequency resource pool, the second time-frequency resource pool, the third time-frequency resource pool, and the fourth time-frequency resource pool each includes a positive integer number of Physical Resource Block Groups (PRBs).

In an embodiment, the first time-frequency resource pool, the second time-frequency resource pool, the third time-frequency resource pool, and the fourth time-frequency resource pool each includes a positive integer number of subchannels.

In an embodiment, the first time-frequency resource pool and the third time-frequency resource pool occupy a same frequency domain resource.

In an embodiment, the second time-frequency resource pool and the fourth time-frequency resource pool occupy a same frequency domain resource.

In an embodiment, the first time-frequency resource pool, the second time-frequency resource pool, the third time-frequency resource pool, and the fourth time-frequency resource pool occupy a same frequency domain resource.

In an embodiment, the first time-frequency resource pool includes a PSSCH.

In an embodiment, the third time-frequency resource pool includes a PSSCH.

In an embodiment, the first time-frequency resource pool includes a PDSCH.

In an embodiment, the third time-frequency resource pool includes a PDSCH.

In an embodiment, the second time-frequency resource pool includes a PSFCH.

In an embodiment, the fourth time-frequency resource pool includes a PSFCH.

In an embodiment, the second time-frequency resource pool includes a PUCCH.

In an embodiment, the fourth time-frequency resource pool includes a PUCCH.

Embodiment 10

Embodiment 10 illustrates a structural block diagram of a processing apparatus used in a first node device according to an embodiment of the present application, as shown in FIG. 10. In FIG. 10, a processing apparatus 1000 in the first node device includes a first receiving set 1001 and a first transmitting set 1002.

In Embodiment 10, the first receiving set 1001 is configured to receive a first wireless signal in a first time-frequency resource pool, and the first wireless signal carries a first block of bits. The first transmitting set 1002 is configured to send first signaling in a second time-frequency resource pool, and the first signaling is used to indicate whether the first block of bits is correctly decoded. The first receiving set 1001 is configured to monitor a second wireless signal in a third time-frequency resource pool, and the second wireless signal carries the first block of bits. When the first signaling indicates that the first block of bits is not correctly decoded, the first transmitting set 1002 sends second signaling in a fourth time-frequency resource pool by using a first power value. When the first signaling indicates that the first block of bits is correctly decoded and the second wireless signal is detected, the first transmitting set 1002 sends the second signaling in the fourth time-frequency resource pool by using a second power value. When the first signaling indicates that the first block of bits is correctly decoded and the second wireless signal is not detected, the first transmitting set 1002 maintains zero transmit power in the fourth time-frequency resource pool. The second signaling is used to indicate whether the first block of bits is correctly decoded.

In Embodiment 10, the second power value is greater than the first power value.

In an embodiment, the first receiving set 1001 receives third signaling, and the third signaling includes scheduling information of the first block of bits.

In an embodiment, the first receiving set 1001 receives fourth signaling, and the fourth signaling is used to determine a difference between the second power value and the first power value.

In an embodiment, the second wireless signal is detected by the first receiving set 1001, and only when the fourth time-frequency resource pool is not reserved for a first type of transmission, the second signaling is sent by the first transmitting set 1002 in the fourth time-frequency resource pool; and the second time-frequency resource pool is not reserved for the first type of transmission.

In an embodiment, the first wireless signal and the second wireless signal are separately transmitted on a PSSCH. The first signaling and the second signaling are separately transmitted on a PSFCH. A transmit power of the first signaling is the first power value. When the first signaling indicates that the first block of bits is correctly decoded and the second wireless signal is detected by the first receiving set 1001, a transmit power of the second signaling is a second power value; and the second power value is greater than the first power value.

In an embodiment, the first wireless signal and the second wireless signal are transmitted on a same PSSCH. The first signaling and the second signaling are separately transmitted on a PSFCH. A transmit power of the first signaling is the first power value. When the first signaling indicates that the first block of bits is correctly decoded and the second wireless signal is detected by the first receiving set 1001, a transmit power of the second signaling is a second power value; and the second power value is greater than the first power value.

In an embodiment, the first wireless signal and the second wireless signal are separately transmitted on a PSSCH. The first signaling and the second signaling are transmitted on a same PSFCH. A transmit power of the first signaling is the first power value. When the first signaling indicates that the first block of bits is correctly decoded and the second wireless signal is detected by the first receiving set 1001, a transmit power of the second signaling is a second power value; and the second power value is greater than the first power value.

In an embodiment, the first wireless signal and the second wireless signal are transmitted on a same PSSCH. The first signaling and the second signaling are transmitted on a same PSFCH. A transmit power of the first signaling is the first power value. When the first signaling indicates that the first block of bits is correctly decoded and the second wireless signal is detected by the first receiving set 1001, a transmit power of the second signaling is a second power value; and the second power value is greater than the first power value.

In an embodiment, the first wireless signal and the second wireless signal are separately transmitted on a PDSCH. The first signaling and the second signaling are separately transmitted on a PUCCH. A transmit power of the first signaling is the first power value. When the first signaling indicates that the first block of bits is correctly decoded and the second wireless signal is detected by the first receiving set 1001, a transmit power of the second signaling is a second power value; and the second power value is greater than the first power value.

In an embodiment, the first node device is UE.

In an embodiment, the first node device is a relay node device.

In an embodiment, the first receiving set 1001 includes at least one of the antenna 420, the receiver 418, the receive processor 470, the channel decoder 478, the controller/processor 475, and the memory 476 in Embodiment 4.

In an embodiment, the first transmitting set 1002 includes at least one of the antenna 420, the transmitter 418, the transmit processor 416, the channel encoder 477, the controller/processor 475, and the memory 476 in Embodiment 4.

Embodiment 11

Embodiment 11 illustrates a structural block diagram of a processing apparatus used in a second node device according to an embodiment of the present application, as shown in FIG. 11. In FIG. 11, a processing apparatus 1100 in the second node device includes a second receiving set 1101 and a second transmitting set 1102.

In Embodiment 11, the second transmitting set 1101 is configured to send a first wireless signal in a first time-frequency resource pool, and the first wireless signal carries a first block of bits. The second receiving set 1102 is configured to monitor first signaling in a second time-frequency resource pool, where the first signaling is used to indicate whether the first block of bits is correctly decoded. When the first signaling is detected and the first signaling indicates that the first block of bits is correctly decoded, the second transmitting set 1101 maintains zero transmit power in a third time-frequency resource pool. When the first signaling is detected and the first signaling indicates that the first block of bits is not correctly decoded, the second transmitting set 1101 sends a second wireless signal in the third time-frequency resource pool. The second receiving set 1102 monitors second signaling in a fourth time-frequency resource pool, and a transmit power of the second signaling is a first power value. When the first signaling is not detected, the second transmitting set 1101 sends the second wireless signal in the third time-frequency resource pool, the second receiving set 1102 monitors the second signaling in the fourth time-frequency resource pool, and the transmit power of the second signaling is a second power value or the first power value. The second wireless signal carries the first block of bits; and the second signaling is used to indicate whether the first block of bits is correctly decoded.

In Embodiment 11, the second power value is greater than the first power value.

In an embodiment, the second transmitting set 1101 sends third signaling, and the third signaling includes scheduling information of the first block of bits.

In an embodiment, the second transmitting set 1101 sends fourth signaling, and the fourth signaling is used to determine a difference between the first power value and the second power value.

In an embodiment, the second wireless signal is detected, and only when the fourth time-frequency resource pool is not reserved for a first type of transmission, the second signaling is sent in the fourth time-frequency resource pool; and the second time-frequency resource pool is not reserved for the first type of transmission.

In an embodiment, the second node device is a base station device.

In an embodiment, the second node device is UE.

In an embodiment, the second node device is a relay node device.

In an embodiment, the second receiving set 1102 includes at least one of the antenna 452, the receiver 454, the receive processor 456, the multi-antenna receive processor 458, the controller/processor 459, the memory 460, and the data source 467 in Embodiment 4.

In an embodiment, the second transmitting set 1101 includes at least one of the antenna 452, the transmitter 454, the transmit processor 468, the multi-antenna transmit processor 457, the controller/processor 459, the memory 460, and the data source 467 in Embodiment 4.

Those of ordinary skill in the art may understand that all or some of the steps in the foregoing method may be completed by instructing relevant hardware through a program, and the program may be stored in a computer-readable storage medium, such as a read-only memory, a hard disk, or an optical disk. Optionally, all or some of the steps in the foregoing embodiments may alternatively be implemented by using one or more integrated circuits. Correspondingly, each module unit in the foregoing embodiments may be implemented in a form of hardware, or may be implemented in a form of a software function module, and the present application is not limited to any specific form of combination of software and hardware. The user equipment, terminal, and UE in the present application include but are not limited to wireless communications devices such as an unmanned aerial vehicle, a communications module on an unmanned aerial vehicle, a remote control aircraft, an aircraft, a small aircraft, a mobile phone, a tablet computer, a laptop, a vehicle-mounted communications device, a wireless sensor, a network card, an Internet of Things terminal, an RFID terminal, an NB-IOT terminal, a Machine Type Communication (MTC) terminal, an enhanced MTC (eMTC) terminal, a data card, a network card, a vehicle-mounted communications device, a low-cost mobile phone, and a low-cost tablet computer. The base station or system device in the present application includes, but is not limited to, wireless communications devices such as a macro cell base station, a micro cell base station, a home base station, a relay base station, an NR node B (gNB), and a TRP.

The foregoing descriptions are merely preferred embodiments of the present application, rather than limiting the protection scope of the present application. Any modification, equivalent replacement, or improvement made without departing from the spirit and principle of the present application shall fall within the protection scope of the present application.

What is claimed is:

1. A first node used for wireless communication, comprising:

a first receiver, configured to receive a first wireless signal in a first time-frequency resource pool, wherein the first wireless signal carries a first block of bits; and a first transmitter, configured to send first signaling in a second time-frequency resource pool, wherein the first signaling is used to indicate whether the first block of bits is correctly decoded;

the first receiver is configured to monitor a second wireless signal in a third time-frequency resource pool, and the second wireless signal carries the first block of bits;

when the first signaling indicates that the first block of bits carried by the first wireless signal is not correctly decoded, the first transmitter sends second signaling in a fourth time-frequency resource pool by using a first power value; when the second wireless signal is detected and the first signaling indicates that the first block of bits carried by the first wireless signal is correctly decoded, the first transmitter sends the second signaling in the fourth time-frequency resource pool by using a second power value; when the second wireless signal is not detected and the first signaling indicates that the first block of bits carried by the first wireless signal is correctly decoded, the first transmitter maintains zero transmit power in the fourth time-frequency resource pool; and the second signaling is used to indicate whether the first block of bits carried by the first wireless signal is correctly decoded, wherein the second power value is greater than the first power value.

2. The first node according to claim 1, wherein the first receiver receives third signaling, and the third signaling comprises scheduling information of the first block of bits.

3. The first node according to claim 1, wherein the first receiver receives fourth signaling, and the fourth signaling is used to determine a difference between the second power value and the first power value.

4. The first node according to claim 1, wherein the second wireless signal is detected, and only when the fourth time-frequency resource pool is not reserved for a first type of transmission, the second signaling is sent by the first transmitter in the fourth time-frequency resource pool; and the second time-frequency resource pool is not reserved for the first type of transmission.

5. The first node according to claim 4, wherein the first type of transmission comprises at least one of followings: an uplink transmission, and hybrid automatic repeat request-acknowledge (HARQ-ACK) for the first transmission of a transport block.

6. A second node used for wireless communication, comprising:

a second transmitter, configured to send a first wireless signal in a first time-frequency resource pool, wherein the first wireless signal carries a first block of bits; and a second receiver, configured to monitor first signaling in a second time-frequency resource pool, wherein the first signaling is used to indicate whether the first block of bits is correctly decoded;

when the first signaling is detected and the first signaling indicates that the first block of bits carried by the first wireless signal is correctly decoded, the second transmitter maintains zero transmit power in a third time-frequency resource pool; when the first signaling is detected and the first signaling indicates that the first block of bits carried by the first wireless signal is not correctly decoded, the second transmitter sends a second wireless signal in the third time-frequency resource pool, the second receiver monitors second signaling in a fourth time-frequency resource pool, and a transmit power of the second signaling is a first power value; when the first signaling is not detected, the second transmitter sends the second wireless signal in the third time-frequency resource pool, the second receiver monitors the second signaling in the fourth time-frequency resource pool, and the transmit power of the second signaling is a second power value or the first power value; the second wireless signal carries the first block of bits; and the second signaling is used to indicate whether the first block of bits carried by the first wireless signal is correctly decoded, wherein the second power value is greater than the first power value.

7. The second node according to claim 6, wherein the second transmitter sends third signaling, and the third signaling comprises scheduling information of the first block of bits.

8. The second node according to claim 6, wherein the second transmitter sends fourth signaling, and the fourth signaling is used to determine a difference between the first power value and the second power value.

9. The second node according to claim 6, wherein the second wireless signal is detected, and only when the fourth time-frequency resource pool is not reserved for a first type of transmission, the second signaling is sent in the fourth time-frequency resource pool; and the second time-frequency resource pool is not reserved for the first type of transmission.

10. The second node according to claim 9, wherein the first type of transmission comprises at least one of followings: an uplink transmission, and hybrid automatic repeat request-acknowledge (HARQ-ACK) for the first transmission of a transport block.

11. A method for a first node used for wireless communication, comprising:

receiving a first wireless signal in a first time-frequency resource pool, wherein the first wireless signal carries a first block of bits;

sending first signaling in a second time-frequency resource pool, wherein the first signaling is used to indicate whether the first block of bits is correctly decoded;

monitoring a second wireless signal in a third time-frequency resource pool, wherein the second wireless signal carries the first block of bits;

when the first signaling indicates that the first block of bits carried by the first wireless signal is not correctly decoded, sending second signaling in a fourth time-frequency resource pool by using a first power value; when the second wireless signal is detected and the first signaling indicates that the first block of bits carried by the first wireless signal is correctly decoded, sending the second signaling in the fourth time-frequency resource pool by using a second power value; and when the second wireless signal is not detected and the first signaling indicates that the first block of bits carried by the first wireless signal is correctly decoded, maintaining zero transmit power in the fourth time-frequency resource pool, wherein the second signaling is used to indicate whether the first block of bits carried by the first wireless signal is correctly decoded, and the second power value is greater than the first power value.

12. The method according to claim 11, further comprising:

receiving third signaling, wherein the third signaling comprises scheduling information of the first block of bits.

13. The method according to claim 11, further comprising:

receiving fourth signaling, wherein the fourth signaling is used to determine a difference between the second power value and the first power value.

14. The method according to claim 11, wherein the second wireless signal is detected, and only when the fourth time-frequency resource pool is not reserved for a first type of transmission, the second signaling is sent in the fourth time-frequency resource pool; and the second time-frequency resource pool is not reserved for the first type of transmission.

15. The method according to claim 14, wherein the first type of transmission comprises at least one of followings: an uplink transmission, and hybrid automatic repeat request-acknowledge (HARQ-ACK) for the first transmission of a transport block.

16. A method for a second node used for wireless communication, comprising:

sending a first wireless signal in a first time-frequency resource pool, wherein the first wireless signal carries a first block of bits;

monitoring first signaling in a second time-frequency resource pool, wherein the first signaling is used to indicate whether the first block of bits is correctly decoded;

when the first signaling is detected and the first signaling indicates that the first block of bits carried by the first wireless signal is correctly decoded, maintaining zero transmit power in a third time-frequency resource pool; when the first signaling is detected and the first signaling indicates that the first block of bits carried by the first wireless signal is not correctly decoded, sending a second wireless signal in the third time-frequency resource pool, and monitoring second signaling in a fourth time-frequency resource pool, wherein a transmit power of the second signaling is a first power value; and when the first signaling is not detected, sending the second wireless signal in the third time-frequency resource pool, and monitoring the second signaling in the fourth time-frequency resource pool, wherein the transmit power of the second signaling is the first power value or a second power value; the second wireless signal carries the first block of bits; the second signaling is used to indicate whether the first block of bits carried by the first wireless signal is correctly decoded; and the second power value is greater than the first power value.

17. The method according to claim 16, further comprising:

sending third signaling, wherein the third signaling comprises scheduling information of the first block of bits.

18. The method according to claim 16, further comprising:

sending fourth signaling, wherein the fourth signaling is used to determine a difference between the first power value and the second power value.

19. The method according to claim 16, wherein the second wireless signal is detected, and only when the fourth time-frequency resource pool is not reserved for a first type of transmission, the second signaling is sent in the fourth time-frequency resource pool; and the second time-frequency resource pool is not reserved for the first type of transmission.

20. The method according to claim 19, wherein the first type of transmission comprises at least one of followings: an uplink transmission, and hybrid automatic repeat request-acknowledge (HARQ-ACK) for the first transmission of a transport block.

\* \* \* \* \*